No. 885,569. PATENTED APR. 21, 1908.
A. E. BERGQUIST.
STRAWBERRY PICKER.
APPLICATION FILED AUG. 14, 1907.
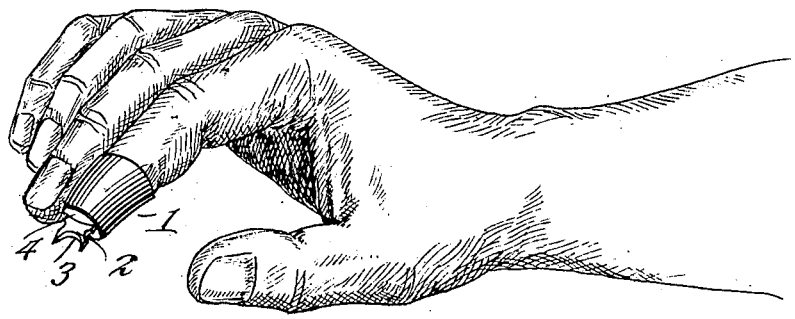
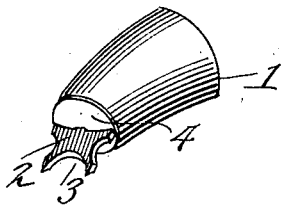
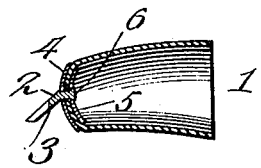
Witnesses
Inventor
Arthur E. Bergquist
By Victor J. Evans
Attorney

UNITED STATES PATENT OFFICE.

ARTHUR E. BERGQUIST, OF LINDSTROM, MINNESOTA.

STRAWBERRY-PICKER.

No. 885,569.　　　Specification of Letters Patent.　　　Patented April 21, 1908.

Application filed August 14, 1907. Serial No. 388,519.

*To all whom it may concern:*

Be it known that I, ARTHUR E. BERGQUIST, a citizen of the United States, residing at Lindstrom, in the county of Chisago and State of Minnesota, have invented new and useful Improvements in Strawberry-Pickers, of which the following is a specification.

This invention is an improved strawberry picking implement comprising a stall or thimble to be placed on a finger and having a plate at its outer end for use in cutting the stems of the berries, as hereinafter described and claimed.

The object of this invention is to provide a cheap, simple, and serviceable implement for use in severing the stems of strawberries while picking the same so that the berries are not injured by the pulling of the stem therefrom as is the case when berries are picked in the ordinary manner and which implement also enables the berries to be picked without danger of bruising or otherwise injuring the same.

In the accompanying drawing, Figure 1 is a perspective view of a strawberry picking implement constructed in accordance with this invention, showing the same in use on the forefinger. Fig. 2 is a detail perspective view of the same. Fig. 3 is a detail longitudinal sectional view of the same.

In accordance with this invention I provide a stall or thimble 1 for use on one of the fingers, usually and preferably on the forefinger, and which is made of elastic material or fabric, such as rubber or a composition of fabric and rubber. At the outer end of the said stall or thimble is a plate 2 which is made of steel and is provided with a concave cutting edge 3 in its outer end adapted for use in severing the stems of strawberries by placing such stems between the thumb and such edge of the plate. The concave shape of such cutting edge of the plate greatly facilitates the application of the plate thereto.

In practice, when picking strawberries, the picker grasps a berry between the thumb and forefinger and manipulates the latter to cause the sharpened edge of the plate of the stall or thimble to cut the stem of the berry so as to leave the stem of a length of about half an inch and attached to the berry, hence leaving the crown or cap of the berry and a portion of the stem intact and avoiding injury to the berry such as results by pulling the berry from the stem as is the usual practice. By thus severing the stems of the berries, when gathering the same, which may be readily done by the picker by the use of my improved implement, the berries are prevented from being bruised and the same caused to remain in good condition very much longer than berries which are pulled, as heretofore, from the stems.

Within the scope of my invention the plate may be attached to the stall or thimble by any suitable means and any suitable manner and I do not desire to limit myself in this particular.

In Fig. 3 of the drawings I show concavo-convex disks 4, 5, respectively on the outer and inner sides of the closed end of the stall or thimble, which disks are made of metal or other suitable strong and durable material, serve to protect the outer end of such stall or thimble and are provided with central openings, to receive the stud 6 with which the said plate is provided, at its inner end, said stud being headed, after it has been thus applied to the said disks to retain and secure the plate in place.

Having thus described the invention, what I claim is:—

1. A berry picking implement of the class described comprising a thimble or stall closed at its outer end, disks on the outer and inner sides of said closed outer end of the thimble or stall and a plate having a stem at its inner end extending through said disks and said closed outer end of the stall.

2. A berry picking implement of the class described comprising a thimble or stall having a closed outer end convex on its outer side and concave on its inner side, concavo-convex disks on the outer and inner sides of said closed outer end of the stall and a plate having a stem at its inner end extending through said disks and said closed outer end of the thimble or stall.

In testimony whereof I affix my signature in presence of two witnesses.

ARTHUR E. BERGQUIST.

Witnesses:
　P. M. QUIST,
　O. L. PETERSON.